United States Patent
Mahoney

(10) Patent No.: US 7,083,858 B1
(45) Date of Patent: Aug. 1, 2006

(54) THERMALLY ACTIVATED ADHESIVE FILMS FOR THE COLLATION OF WIRE STAPLES

(75) Inventor: Robert Mahoney, Hampstead, NH (US)

(73) Assignee: Worthen Industries, Inc., Nashua, NH (US)

( * ) Notice: Subject to any disclaimer, the term of this patent is extended or adjusted under 35 U.S.C. 154(b) by 41 days.

(21) Appl. No.: 10/184,704

(22) Filed: Jun. 28, 2002

Related U.S. Application Data

(63) Continuation of application No. 09/908,228, filed on Jul. 18, 2001, now abandoned.

(60) Provisional application No. 60/220,733, filed on Jul. 26, 2000.

(51) Int. Cl.
*B32B 15/085* (2006.01)
*B32B 27/32* (2006.01)
*B21F 45/24* (2006.01)

(52) U.S. Cl. .................... 428/461; 428/457; 59/71; 59/77

(58) Field of Classification Search .............. 59/71, 59/77; 428/457, 461
See application file for complete search history.

(56) References Cited

U.S. PATENT DOCUMENTS

| | | | | |
|---|---|---|---|---|
| 2,125,211 A | * | 7/1938 | Vogel | 59/77 |
| 3,267,660 A | * | 8/1966 | Matthews | 59/77 |
| 3,339,720 A | * | 9/1967 | Barnes | 206/343 |
| 4,000,763 A | * | 1/1977 | Jansson | 140/82 |
| 4,018,333 A | * | 4/1977 | Blackwood | 206/343 |
| 4,066,165 A | * | 1/1978 | Ruskin | 206/340 |
| 4,275,813 A | * | 6/1981 | Noiles | 206/339 |
| 4,664,733 A | * | 5/1987 | Masago | 156/212 |
| 5,303,539 A | * | 4/1994 | Neamtu | 59/75 |
| 5,360,305 A | * | 11/1994 | Kerrigan | 411/472 |
| 5,414,991 A | * | 5/1995 | Kfir et al. | 59/77 |
| 5,795,121 A | * | 8/1998 | Tucker et al. | 411/442 |
| 5,803,396 A | * | 9/1998 | Dewaele | 242/532.6 |
| 5,875,538 A | * | 3/1999 | Kish et al. | 29/469.5 |

FOREIGN PATENT DOCUMENTS

| | | | |
|---|---|---|---|
| CA | 2306356 A1 | * | 10/2001 |
| DE | 1101338 | * | 3/1961 |
| JP | 57-72741 A | * | 5/1982 |

* cited by examiner

*Primary Examiner*—David W. Wu
*Assistant Examiner*—Rip A. Lee
(74) *Attorney, Agent, or Firm*—Gauthier & Connors LLP

(57) ABSTRACT

A thermally activated adhesive for coating and holding a multi-end band wire together through a high volume, high speed banding line which comprises a polyolefin in an amount of 2 to 98% by weight based upon the total weight of the adhesive, an acid in an amount of 1 to 20% by weight based upon the total weight of the adhesive and a rubber polymer in an amount of 1 to 20% by weight based upon the total weight of the adhesive. The adhesive activates in a temperature range of between 200° F. to 500° F. and is characterized in that it has a tensile strength of between 1,500 to 10,000 psi as determined by ASTM D638-96 and a peel strength of between 5 to 10 PLI as determined by ASTM D903-93.

12 Claims, 1 Drawing Sheet

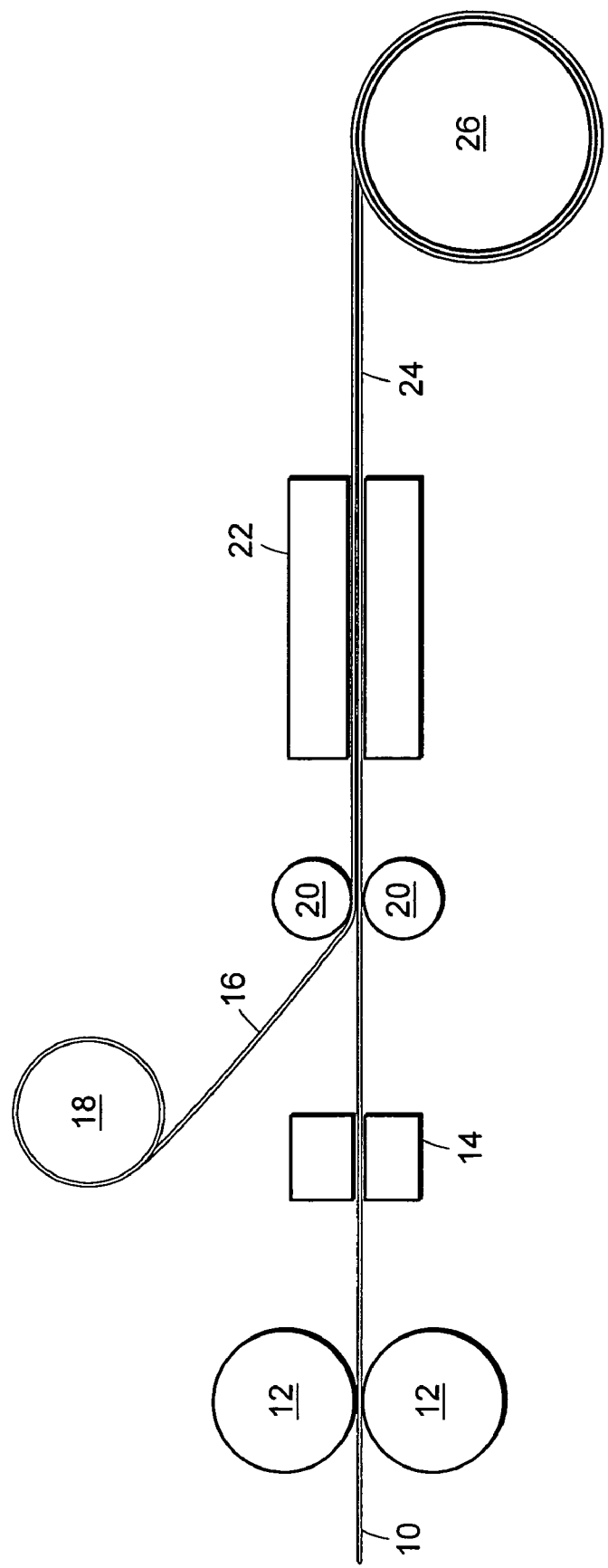

THERMALLY ACTIVATED ADHESIVE FILMS FOR THE COLLATION OF WIRE STAPLES

PRIORITY INFORMATION

This application is a Continuation Application of U.S. application Ser. No. 09/908,228, filed on Jul. 18, 2001, now abandoned, claiming priority to U.S. Provisional Application Ser. No. 60/220,733, filed on Jul. 26, 2000.

BACKGROUND AND BRIEF SUMMARY OF THE INVENTION

A currently preferred method for collating fine wire staple sticks is to use a liquid adhesive system that is applied to a multi-end band wire. The adhesive is then dried by heat and air leaving a solid film coating on the band of wire for pressing staple sticks in line or wound up onto spools for subsequent staple pressing.

These liquid adhesive systems must dry quickly to produce a high strength film to hold the strips of the band together through wind up. The adhesive must also have sufficient tensile strength and impact resistance to pass the pressing step and ultimate end use, discharge from a fastening gun.

Additional problems with the liquid systems include the use of solvents that are regulated requiring special handling equipment, process equipment and disposal equipment. For some liquid adhesive systems, expensive drying equipment must be used utilizing high energy to remove up to 80% by weight of the supplied liquid adhesive system.

More efficient, lower cost drying systems have been designed and utilized through the years with significant improvement but the use of solvents and their associated costs have not changed.

Wire end machines have utilized thermally activated film tapes which are applied after the staples have been pressed. These tapes, however, are not designed to cover the total surface of the staple stick and can only be applied to the outer surface limiting stiffness and impact resistance. This production method is primarily used for lower volume specialty staples where high speed volume is not critical.

It would desirable to have thermally activated adhesive films which can set quickly and can have consistent physical properties, such as tensile strength, impact resistance, and high adhesion to metal surfaces.

Broadly the invention comprises a 100% solid thermally activated adhesive film, instead of a liquid adhesive, to coat and hold together a multi-strip band of wire together through a high volume, high speed banding line. Heat is used for film activation. The adhesive film reduces the amount of energy needed to process staples, reduces capital equipment needs and also offers an alternative adhesive system for improved physical properties, e.g. tensile strength, impact resistance and adhesion.

In the preferred embodiment, the adhesive system comprises a three-part, polyethylene based polymer. The modified polyethylene is 100% solids, activates in a temperature range of 200° F. to 450° F., is acid modified for polarity sites for bonding, and embodies a rubber polymer or elastomeric phase to minimize adhesive surface fracture and ensures high adhesion to the metal surface.

BRIEF DESCRIPTION OF THE DRAWINGS

The FIGURE is a process flow diagram embodying the invention.

DESCRIPTION OF THE PREFERRED EMBODIMENT(S)

Extrusion techniques, or other manufacturing processes, for mixing resins and extruding the same as films, pellets, etc. are well known in the art and need not be described in detail.

Thermoplastic resins are used for both cast and blown film adhesives and include the polyolefins, polyethylene and polypropylene and copolymers of the same. Also within the scope of the invention are urethanes, nylons and polyesters.

Films are extruded with a gauge range of 0.001–0.005 inches with 0.001 inch preferred. Films are laminated to the wire band, typically between 3–12 inches in width and 1–5,000 yards in length and rolled on spools for further processing.

Referring to the drawing, a wire band shown at 10 passes through rollers 12 which flatten the wire band 10. The band 10 then passes through a heat source 14, such as infrared, induction or convention where the surface is heated to a temperature of between 200° F.–500° F. An adhesive film 16 is then wound from a supply roll 18 and passes through laminating rolls 20. The adhesive film can be activated in a temperature range of 200° F. to 500° F., preferably 300° F. to 450° F. It is laminated onto the pre-heated band of wire 10 with roll pressure, e.g. 0–100 PLI, and immediately cooled in a cooling tunnel 22 to ambient temperature 72° F. The cooling eliminates any tack and ensures sufficient bond to the metal wire. The coated band 24 is wound on a spool 26.

A preferred adhesive is set forth in the following non-limiting example.

Example 1

Materials

Low density polyethylene (0.870–0.920) 2 to 98% by weight.

Maleic anhydride acid 1 to 20% by weight; and

Synthetic rubber 1 to 20% by weight, e.g. EPDM.

The materials were blended in an extruder and extruded as pellets.

The pellets were further extruded as a film at a gauge of 0.001–0.005".

To determine the suitability of the adhesive for its intended purpose, tensile properties and metal adhesion tests were performed.

The tensile strength was between 1,500 to 10,000 psi as determine by ASTM D638-96 and peel strength was between 5 to 10 PLI as determined by ASTM D903-93. These physical properties establish the suitability of the adhesive system for use in a high volume, high speed banding line. Typical volumes and speeds would be 500–1,000 lbs/hr @ 25–100 fpm.

Other acids to provide polarity and chemical bonding to metal include carboxylic derivatives, e.g. acrylic acid, methacrylic acid.

Other polymers/copolymers that may be utilized for the backbone include high, medium and low density polyethylenes, propylene and propylene ethylene copolymers.

The foregoing description has been limited to a specific embodiment of the invention. It will be apparent, however, that variations and modifications can be made to the invention, with the attainment of some or all of the advantages of the invention. Therefore, it is the object of the appended claims to cover all such variations and modifications as come within the true spirit and scope of the invention.

Having described my invention what I now claim is:

1. A method of coating a multi-end band wire which comprises:

flattening the band wire;

heating the band wire to form a pre-heated band wire;

contacting an adhesive film to the pre-heated band wire;

activating the adhesive film to form a coated band wire; and cooling the coated band wire.

2. The method of claim 1 wherein the heating step comprises passing the band wire through a heat source having a temperature range of between 200° F. to 500° F.

3. The method of claim 2 wherein the contacting step comprises:

unwinding the adhesive film from a supply roll and laminating the adhesive film onto the pre-heated band wire.

4. The method of claim 3 wherein the laminating step is accomplished with a roll pressure within the range of about 0–100 PLI.

5. The method of claim 1 wherein the adhesive film has a gauge of about 0.001–0.005 inches.

6. The method of claim 1 wherein the band wire has a width of about 3–12 inches.

7. The method of claim 1 wherein the band wire has a length of about 5,000 yards.

8. The method of claim 1 which further comprises:

winding the coated band wire.

9. The method of claim 4 wherein the adhesive film comprises:

a thermoplastic.

10. The method of claim 9 wherein the thermoplastic is selected from the group consisting of polyolefins, polyethylenes, polypropylenes and copolymers of polyethylene and polypropylene.

11. The method of claim 9 wherein the adhesive film is has a tensile strength of about 1,500 to 10,000 psi as determined by ASTM D638-96.

12. A method of coating a multi-end band wire which comprises:

heating the band wire to a temperature within the range of about 200° F.–500° F. to form a pre-heated band wire;

laminating an adhesive thermoplastic film selected from the group consisting of polyolefins, polyethylene, polypropylene and copolymers of polyethylene and polypropylene to the pre-heated band wire to form a laminated band wire; and cooling the laminated band wire.

* * * * *